(12) United States Patent  
Marioni

(10) Patent No.: US 8,128,381 B2  
(45) Date of Patent: Mar. 6, 2012

(54) ELECTRIC MOTOR AND ELECTROPUMP

(75) Inventor: Elio Marioni, Dueville (IT)

(73) Assignee: Askoll Holding S.r.l. (IT)

(*) Notice: Subject to any disclaimer, the term of this patent is extended or adjusted under 35 U.S.C. 154(b) by 547 days.

(21) Appl. No.: 12/368,811

(22) Filed: Feb. 10, 2009

(65) Prior Publication Data

US 2009/0202372 A1    Aug. 13, 2009

(30) Foreign Application Priority Data

Feb. 13, 2008    (EP) ..................... 08425089

(51) Int. Cl.  
    *F04B 39/02* (2006.01)  
    *F04B 39/06* (2006.01)
(52) U.S. Cl. ............... 417/366; 417/368; 417/423.11
(58) Field of Classification Search ............. 417/1–47, 417/410.1, 420, 423.1, 423.7, 423.11, 423.3, 417/423.8, 423.9, 423.13, 366–371  
See application file for complete search history.

(56) References Cited

U.S. PATENT DOCUMENTS

| 2,829,286 | A | | 4/1958 | Britz |
| 4,047,847 | A | * | 9/1977 | Oikawa ..................... 417/370 |
| 6,140,725 | A | | 10/2000 | Jensen et al. |
| 2005/0118044 | A1 | * | 6/2005 | Inoue et al. ................ 417/423.7 |
| 2006/0093502 | A1 | * | 5/2006 | Wallerstorfer .......... 417/423.14 |

FOREIGN PATENT DOCUMENTS

| DE | 9210400 U1 | 9/1993 |
| DE | 4300401 A1 | 7/1994 |
| EP | 0520303 A2 | 12/1992 |
| GB | 1237633 A | 6/1971 |

* cited by examiner

*Primary Examiner* — Nimeshkumar Patel  
*Assistant Examiner* — Jose M Diaz  
(74) *Attorney, Agent, or Firm* — Ackerman Senterfitt

(57) ABSTRACT

An electric motor comprising a stator of the type having polar expansions of the wound type, a rotor chamber defined by a sealed case, closed by a sealing ring, a permanent magnet rotor, housed inside the rotor chamber and a shaft connected to the rotor. The electric motor comprises a valve which allows outflow of fluid from said rotor chamber; the valve is formed by a through bore provided on the sealing ring and an opposing wall for closing the bore; the wall is provided in a wall of a sealing ring holding disc which is form coupled to the sealing ring.

12 Claims, 5 Drawing Sheets

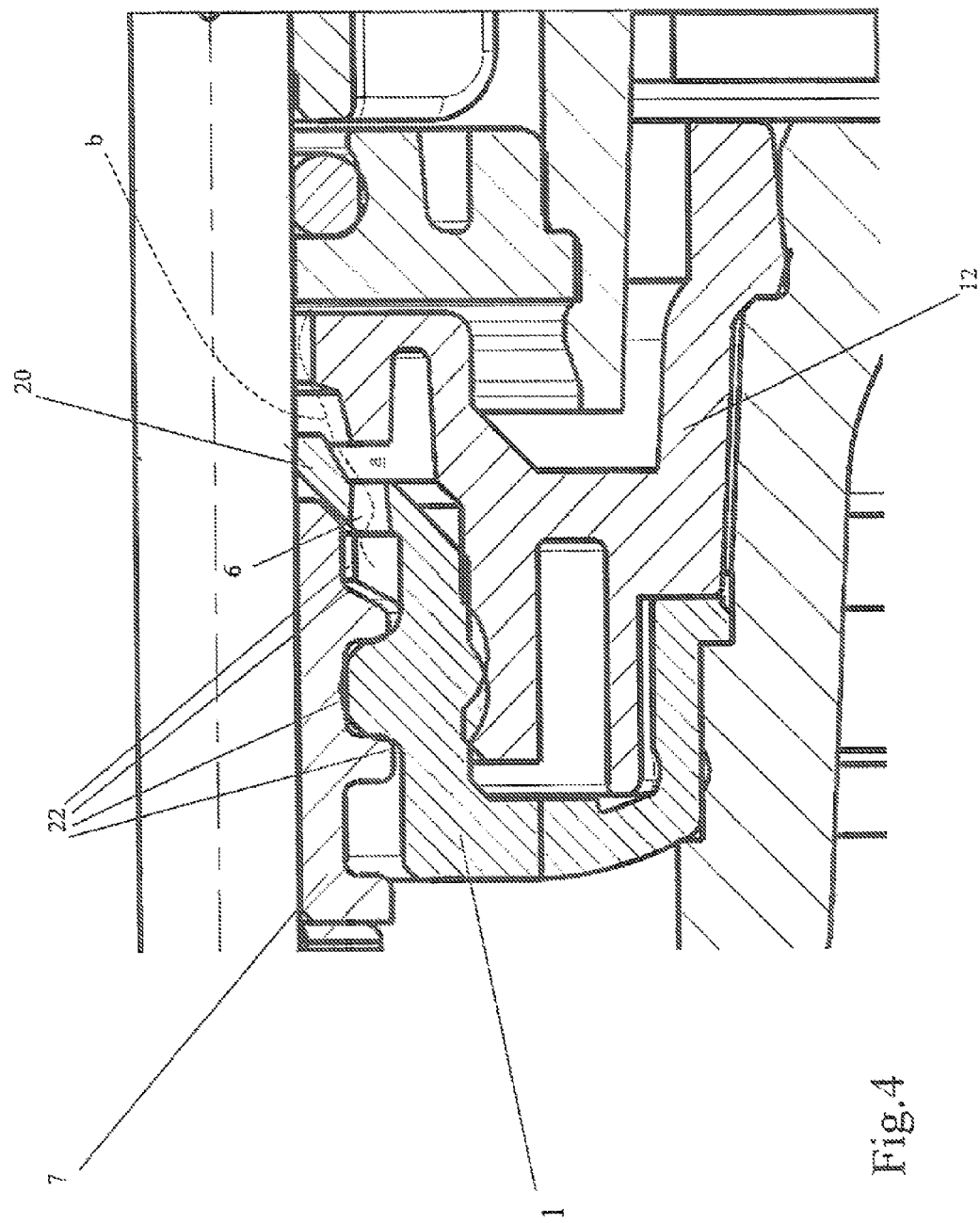

ELECTRIC MOTOR AND ELECTROPUMP

TECHNICAL FIELD

The present invention relates to an electric motor comprising a stator having polar expansions of the wound type, a rotor chamber defined by a sealed case closed by a sealing ring, a permanent magnet rotor housed inside said rotor chamber and a shaft rigidly connected to said rotor.

The invention further refers to an electric motor pump, in particular for a dish washing machine or a washing machine or similar household appliance, said electric motor pump comprising a rotor wheel and an electric motor for rotating said wheel, said electric motor being of above said type.

KNOWN ART

An electric motor pump is known, in particular for a washing machine or a dish washing machine, comprising an electric motor of above said kind.

Said electric motor pump, during operation, runs through hot cycles, wherein high temperatures are reached, as well as cold cycles, in which lower temperatures are achieved, which near the external ambient temperature.

The shaft is able to move axially, in a limited way, on its own axis. In this way, the permanent magnets tend to position themselves in a magnetic equilibrium state, of maximum efficiency, in order to allow maximum hydraulic efficiency of the electric motor pump.

The sealing ring is normally formed as a hollow body with radial symmetry and with an end lip surrounding the shaft, which is optionally in sliding contact with the same, so that to prevent water leakage (in any case, friction should be low, in order to not excessively hinder shaft rotation). The end lip has a conical shape directed towards the outside, in other words, it converges towards the outside, and this too is provided in order to achieve at least a partial sealing.

The sealing ring is often housed in a sealing ring holding disc, formed of plastic material.

The sealing ring is designed in order to define a labyrinth, which allows a small water leakage, but inhibits dirt from passing through, since it is blocked by the interstices formed inside the labyrinth.

Therefore, the rotor chamber fills with water: such an electric motor type is in fact normally called an "immersed rotor motor".

As already described, during hot cycles, high temperatures are achieved. In particular, inside the rotor chamber, these temperatures are so high as to cause water to evaporate: vapor exerts a pressure on the sealing ring, which is directed outwardly, in particular on the end lip, which opens in order to allow vapor venting.

When, in particular during successive cold cycles; the temperature inside the rotor chamber drops, the rotor chamber is depressurized with respect to the outside: the sealing ring is subject to a force directed inwardly. The sealing ring does not allow air to pass, due to its conical shape directed towards the outside of end lip. Therefore, the end lip closes around the shaft, causing undesirable high friction forces.

Moreover, the end lip and depressurization cause the shaft to be pushed inwardly, so that permanent magnets are displaced from their magnetic equilibrium of maximum efficiency, towards lower efficiency locations, thereby reducing the electric motor efficiency, and overall hydraulic efficiency of the electric motor pump.

The technical problem to be solved by the present invention is to develop a motor having structural and functional features which remove above said drawbacks.

SUMMARY OF THE INVENTION

The idea of the solution on which the present invention is based is to avoid pressure differences occurring between the inside of the rotor chamber and the outside.

Based on this solution concept, the technical problem is solved by an electric motor according to claim 1.

This electric motor comprises a valve which allows fluid to flow from said rotor chamber.

Preferably, said valve is unidirectional (check valve), in particular of the flap valve type.

In a preferred embodiment, said unidirectional valve is formed by a through bore provided on the sealing ring and by a opposing wall, which is able to close said bore.

Preferably, said sealing ring is deformable between a first position, in which said bore is closed by a sealing ring holding disc, and a second position, in which said bore is separated from said sealing ring holding disc, so as to communicate said rotor chamber with the outside.

At last, the present invention is solved by an electric motor pump according to claim 11.

The features and advantages of the solution according to the invention will become evident from the following description of an exemplary embodiment of same, which is provided only for illustrative and non limiting purposes, with reference to attached drawings.

BRIEF DESCRIPTION OF THE DRAWINGS

In the drawings:
FIG. 4 shows a view analogous to FIG. 3, during its transient phase following transition from hot to cold cycle.

DETAILED DESCRIPTION

Figure 1:
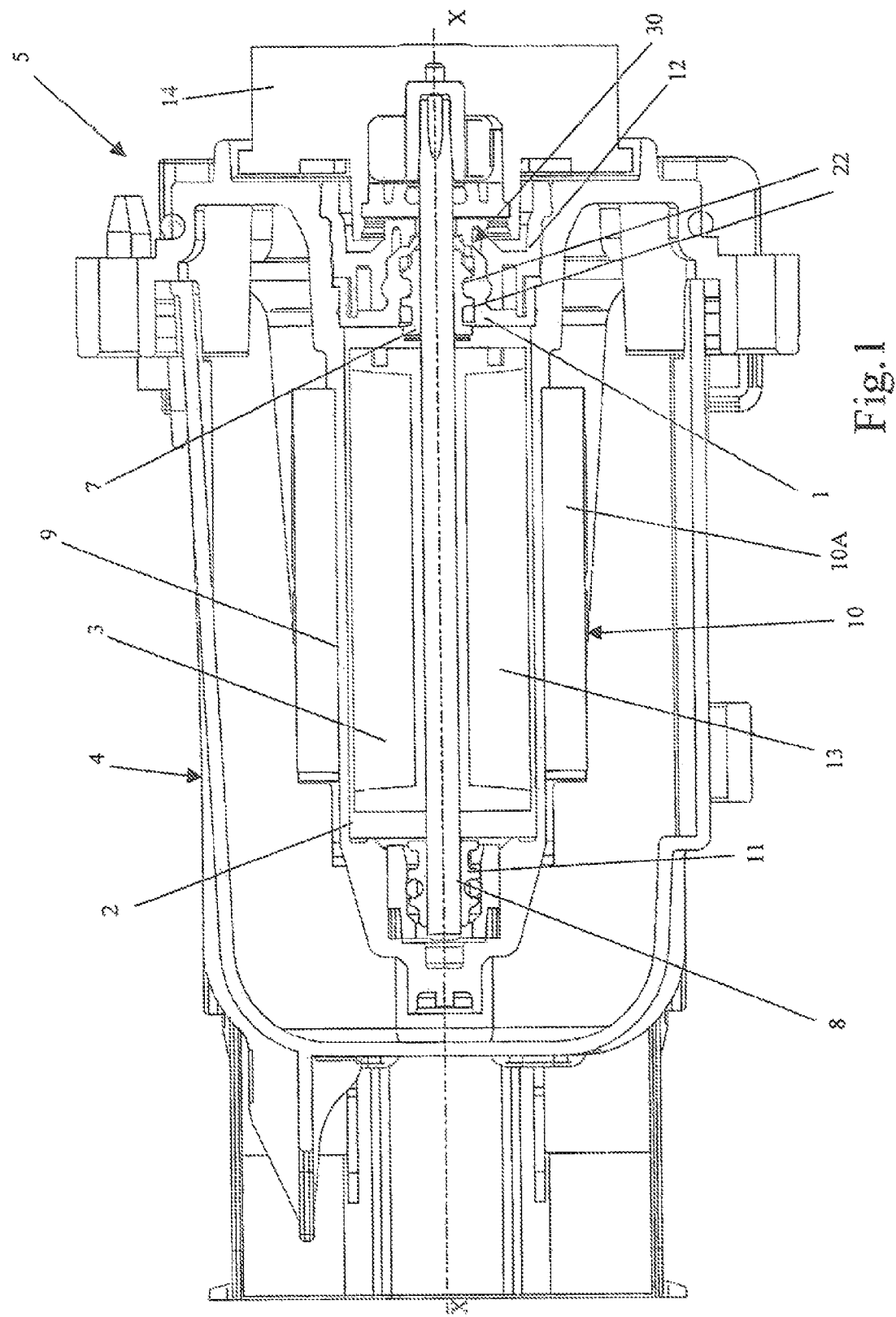
FIG. 1 shows a sectional axial view of an electric motor pump endowed with an electric motor according to the invention.
Figure 2:
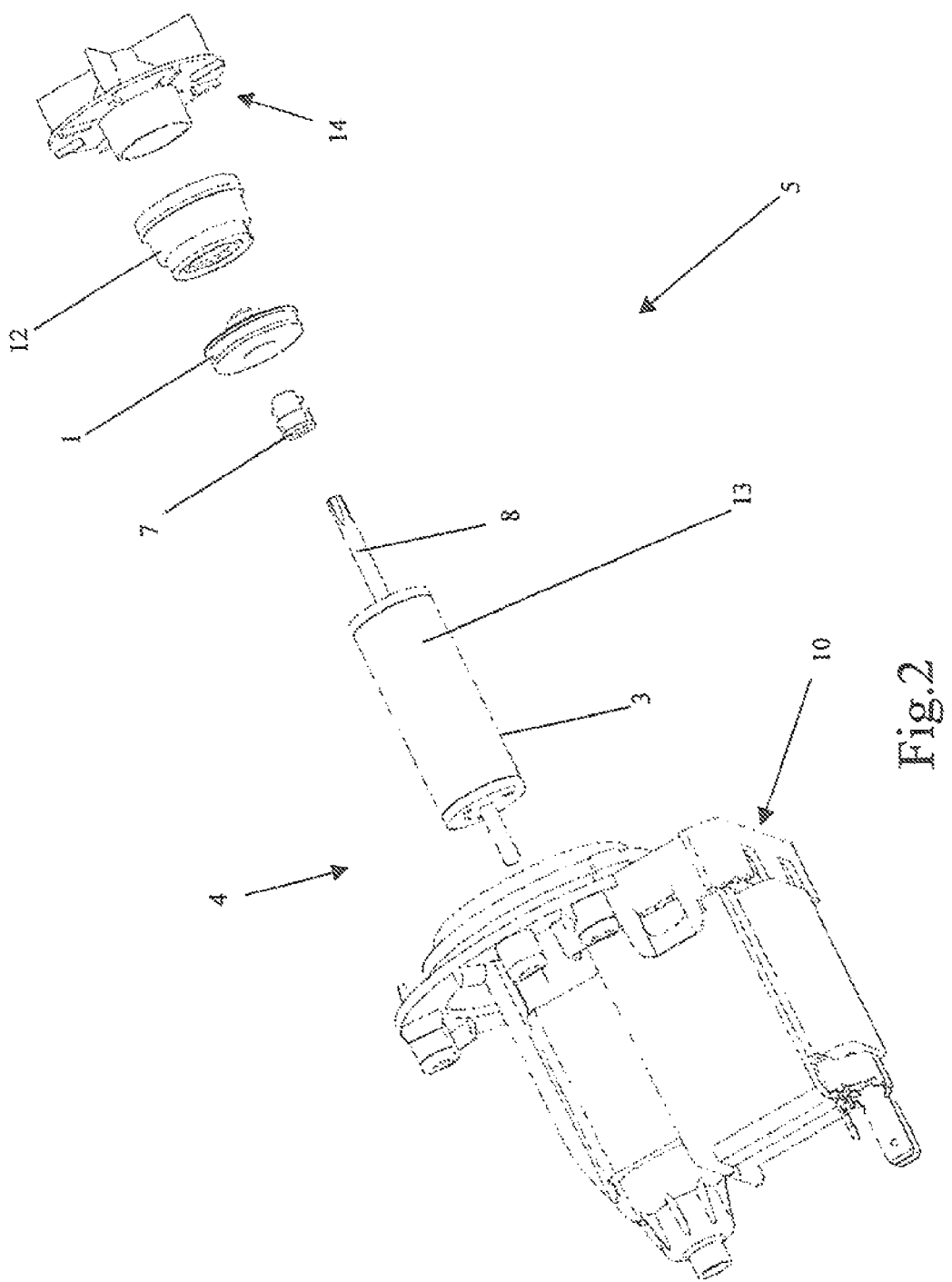
FIG. 2 shows a perspective sectional, axially exploded view of the electric motor pump of FIG. 1, during its hot cycle.

An electric motor pump, for example for a clothes washing machine, according to the invention, is generally referenced by 5. Said electric motor pump 5 comprises a rotor wheel 14 housed inside a rotor wheel chamber, which is not shown, since it is of the conventional type. Said rotor wheel 14 is connected to a suction conduit, for drawing liquids from external ducts, and to a pressure conduit, for pushing said liquid towards further external conduits.

According to its use, the electric motor pump 5 runs through hot cycles alternating with cold cycles.

Said rotor wheel 14 is rotated around an axis XX by an electric motor 4 inside the electric motor pump 5, by means of a shaft 8.

The electric motor 4 is of the synchronous type, with permanent magnets, in the present case of the single-phase type (it may be for example of the two-phase type).

This electric motor 4 comprises a stator 10 with a pair of polar expansions 10A, which are wound around by conventional coils, said polar expansions 10A being such as to generate a magnetic field in the air gap, as usual in electric motors.

The electric motor 4 also comprises a rotor chamber 2, which is defined in a sealed case 9.

Moreover, the electric motor 4 comprises a rotor 3 of the type comprising permanent magnets 13, and which is housed inside said rotor chamber 2 and which is separated from the walls of said rotor chamber.

Rotor 3 and shaft 8 are per se able to move freely, although in a limited way, along rotation axis XX, between a maximum efficiency position, in which permanent magnets 13 are positioned in their magnetic equilibrium position, and positions deviating from said maximum efficiency position. The attraction force exerted by said permanent magnets is such as to normally position the rotor 3 and shaft 8 in maximum efficiency positions.

Shaft 8, connected to stator 3, is rotatably inserted into the stator structure by means of interposed bushings/bearings 7, 11. The shaft 8, in order to rotate the rotor wheel 14, extends out of said rotor chamber 2.

A sealing ring 1 is disposed in order to close said rotor chamber 2; said sealing ring 1 is formed by a generally axially symmetrical body of plastic material, provided with a central bore along rotation axis XX, for being passed through by shaft 8.

According to the invention, the sealing ring 1 comprises an eccentric through bore 6.

Moreover, the sealing ring 1 is shape coupled to an external sealing ring holding disc 12.

In particular, the sealing ring 1 comprises an end portion defining an end lip 20, which is of generally conical shape directed outwardly (the conical shape may also comprise a frusto-conical shape). The inside of end lip 20 is originally provided for a light sliding contact with the electric motor pump shaft, so as to provide a certain sealing, even if due to friction with said shaft, in the course of time, said end lip progressively wears out.

A bushing/bearing 7 is shape coupled to said sealing ring 1, in order to define a labyrinth 22, for decelerating and/or reducing the liquid inflow inside the rotor chamber 2, and which is able to inhibit dirt from entering the inside of the rotor chamber 2.

The sealing ring holding disc 12, which is coaxial with shaft 8, comprises an annular protrusion 23, which is coaxial with axis XX, which defines a wall 31 opposed to said bore 6. Advantageously, a valve 30, of the flap type, is formed by the bore 6 of sealing ring 1 and by opposed wall 31 of sealing ring holding disc 12. The sealing ring is able to deform between a first position (FIGS. 1 and 3), in which said bore 6 is closed by said sealing ring holding disc 12, and a second position (FIG. 4), in which said bore 6 is separated from said sealing ring holding disc 12, so as to fluidly communicate said rotor chamber 2 with the outside.

Due to the sequence of alternating hot and cold cycles, programmed for the washing machine, the rotor chamber 2 is subject to a variable pressure, varying between a pressure higher than the external ambient pressure, which is normally reached during hot cycles, by which water inside the rotor chamber 2 evaporates and vapor pushes outwardly, and a pressure lower than the external ambient pressure, which is normally reached by a quick temperature drop due to a cold cycle immediately following a hot cycle.

Figure 3:
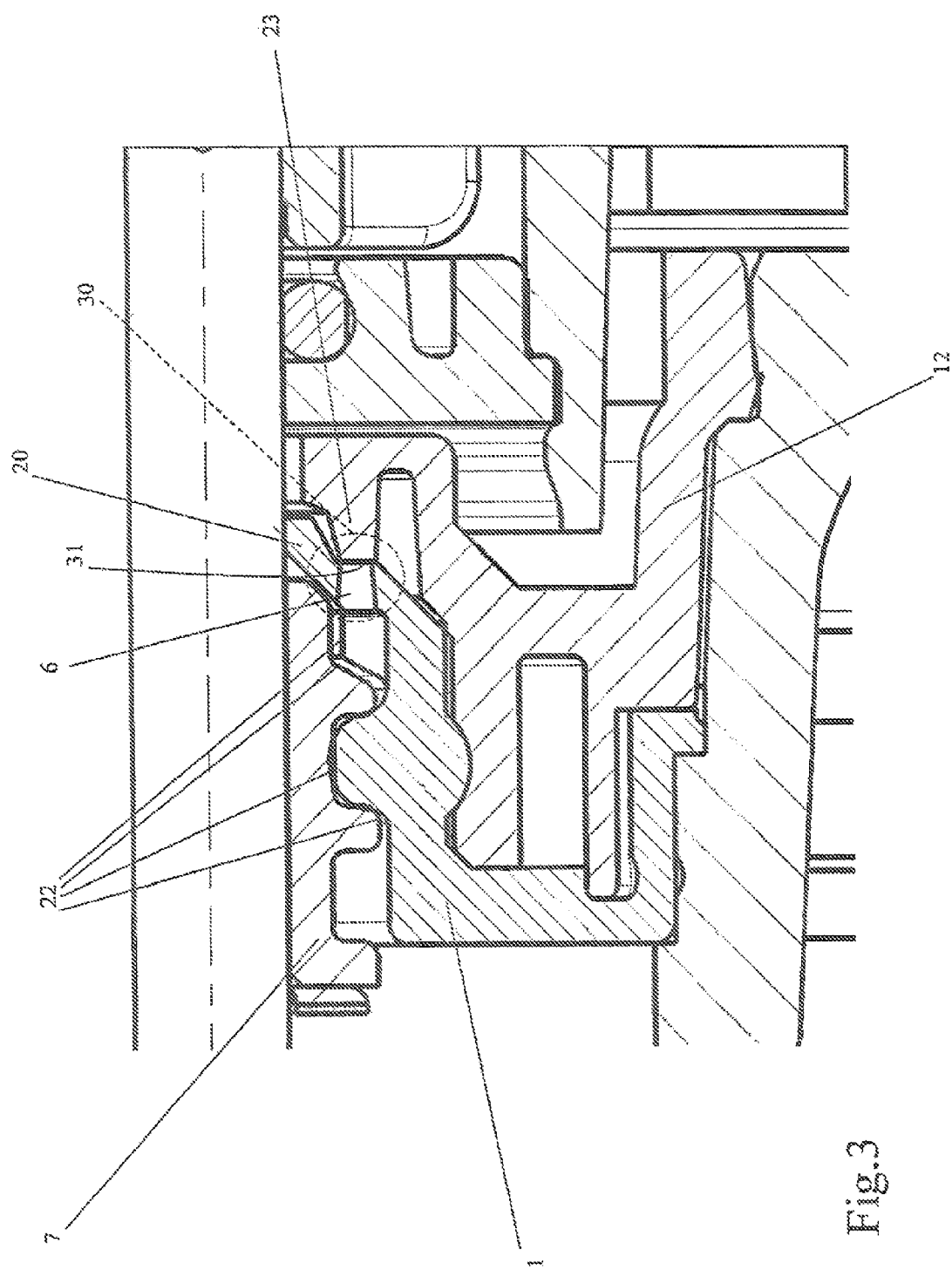
FIG. 3 shows a partial enlarged view of FIG. 2, of the electric motor pump operating during its hot cycle.
Figure 6:
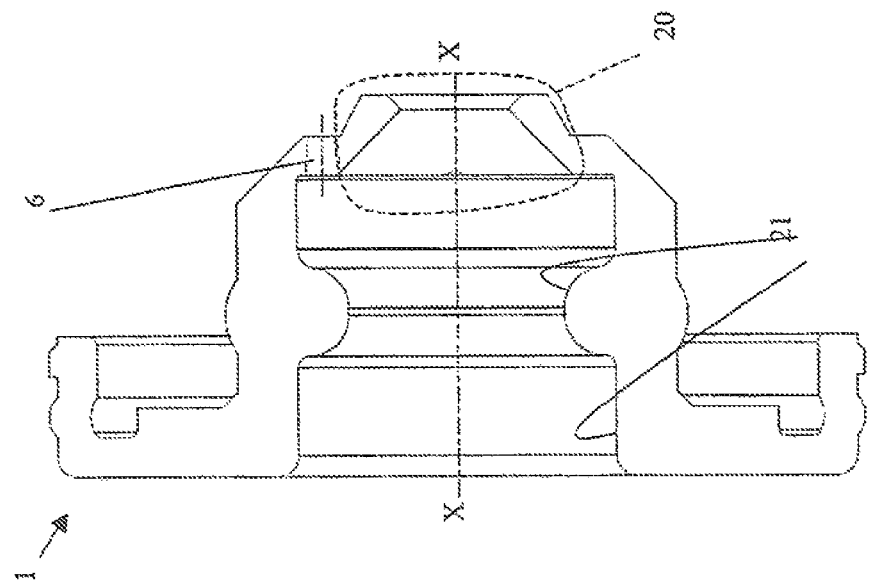
FIG. 6 shows a sectional view according to line A-A of FIG. 5.
Figure 5:
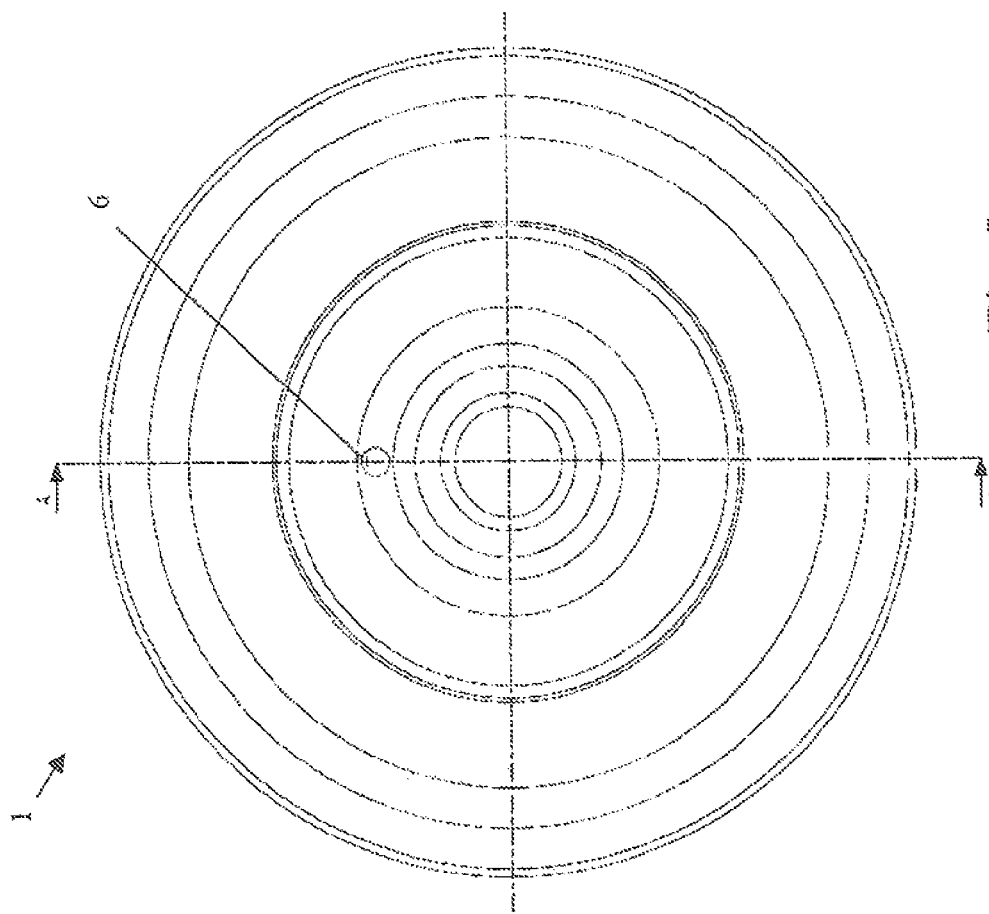
FIG. 5 shows a plane view of a detail of electric motor pump in FIG. 1.

When the rotor chamber 2 is at a pressure higher than the ambient pressure, the valve 30 is closed, as shown in FIGS. 1 and 3. In this situation, vapor exits the rotor chamber 2 passing through interstices formed by labyrinth 22, or between the bushing/bearing 7 and shaft 8, venting through the end lip 20, which therefore opens. It is to be noted that vapor pushes the bushing/bearing 7 against the sealing ring 1, and the sealing ring 1 against the sealing ring holding disc 12. Bore 6 of ring 1 is closed by the sealing ring holding disc 12.

When the rotor chamber is at a pressure lower than external ambient pressure, valve 30 opens. In fact, the external ambient pressure, since it is higher than the pressure inside the rotor chamber 2, pushes inwardly: the rotor 3 temporarily shifts inwardly, so that wall 31 of sealing ring holding disc 12 is temporarily separated from sealing ring 1, and bore 6 is opened.

Since, as can be seen, valve 30 is connected to labyrinth 22, it can fluidly communicate the rotor chamber 2 to the outside, so that air may pass into rotor chamber in order to achieve pressure equilibrium between the inside of rotor chamber 2 and the outside.

In fact, between the sealing ring 1 and sealing ring holding disc 12, a passage a is formed (shown in an exaggerated scale in FIG. 4, in order to be easily visible), which therefore permits a fluid passage b to be formed. Due to passage b, air passes through labyrinth 22 and reaches rotor chamber 2. Therefore, depression inside rotor chamber 2 ceases to exist and sealing ring 1 may return to said initial position (FIGS. 1 and 3).

It is to be noted that the presence of valve 30 does not imply dirt entering said rotor chamber, since labyrinth 22 defined by contact ring and bushing/bearing is provided.

Permanent magnets 13 may therefore remain in a magnetic equilibrium position, thus of maximum efficiency, without reducing overall hydraulic efficiency of electric motor pump.

The greatest advantage of electric motor according to the present invention is its continuity regarding efficiency, since efficiency during hot cycles is same as during cold cycles, without efficiency drops due to movements of permanent magnets and friction between sealing ring lips and shaft.

A further advantage of the present invention is its simple construction, which is a very important aspect for a mass produced item.

Moreover, such an electric motor is more reliable and allows long maintenance-free life.

The invention claimed is:
1. An electric motor comprising:
a stator of the type having polar expansions of the wound type,
a rotor chamber defined by a sealed case closed by a sealing ring,
a permanent magnet rotor housed inside said rotor chamber and a shaft connected to said rotor, and
a valve which allows outflow of fluid from said rotor chamber,
wherein said valve is formed by a through bore provided on said sealing ring and an opposing wall for closing said bore, and
wherein said wall is provided in a wall of a sealing ring holding disc which is form coupled to said sealing ring.
2. An electric motor according to claim 1, wherein said valve is of the unidirectional type.
3. An electric motor according to claim 1, wherein said valve is generally of the flat type.
4. An electric motor according to claim 1, wherein said bore is parallel to rotation axis of said rotor and is in an eccentric position.

5. An electric motor according to claim 1, wherein said sealing ring comprises a conical end portion with lips surrounding said shaft and having a conical shape directed outwardly.

6. An electric motor according to claim 1, comprising a labyrinth fluidly communicating with said valve.

7. An electric motor according to claim 5, wherein said shaft is rotatably supported by means of interposed bushings/bearings, said shaft extending out of said rotor chamber beyond said sealing ring, said sealing ring being able to house one of said bushings/bearings.

8. An electric motor according to claim 6, wherein said labyrinth is formed by interstices provided between a bushing/bearing and said sealing ring.

9. An electric motor according to claim 1, wherein said sealing ring is able to deform between a first position, in which said bore is closed by said sealing ring holding disc, and a second position, in which said bore is separated from said sealing ring holding disc, so as to fluidly communicate said rotor chamber with the outside.

10. An electric motor pump, in particular for a dishwashing machine or a clothes washing machine or similar household appliance, said electric motor pump comprising a rotor wheel and an electric motor for rotating said rotor wheel, said electric motor being of the type according to claim 1.

11. An electric motor comprising:
a stator of the type having polar expansions of the wound type;
a rotor chamber defined by a sealed case closed by a sealing ring;
a permanent magnet rotor housed inside said rotor chamber;
a shaft connected to said rotor;
a valve which allows outflow of fluid from said rotor chamber; and
a labyrinth fluidly communicating with said valve, wherein said labyrinth is formed by interstices provided between a bushing/bearing and said sealing ring.

12. An electric motor comprising:
a stator of the type having polar expansions of the wound type;
a rotor chamber defined by a sealed case closed by a sealing ring;
a permanent magnet rotor housed inside said rotor chamber;
a shaft connected to said rotor; and
a valve which allows outflow of fluid from said rotor chamber,
wherein said valve is formed by a through bore provided on said sealing ring and an opposing wall for closing said bore, and
wherein said sealing ring is able to deform between a first position, in which said bore is closed by a sealing ring holding disc, and a second position, in which said bore is separated from said sealing ring holding disc, so as to fluidly communicate said rotor chamber with the outside.

* * * * *